Jan. 19, 1932.  O. SCHMIDT  1,841,639
COUPLING
Filed Aug. 31, 1929

INVENTOR
OMMO SCHMIDT
BY
ATTORNEY

Patented Jan. 19, 1932                                                1,841,639

UNITED STATES PATENT OFFICE

OMMO SCHMIDT, OF BERLIN, GERMANY, ASSIGNOR TO TELEFUNKEN GESELLSCHAFT FUR DRAHTLOSE TELEGRAPHIE M. B. H., OF BERLIN, GERMANY, A CORPORATION OF GERMANY

COUPLING

Application filed August 31, 1929, Serial No. 389,648, and in Germany September 2, 1928.

In radio frequency installations and equipment, especially of the kind adapted for operation with short waves, recourse is frequently had, both at the sending as well as at the receiving end, to concentric double lines comprising an interior or internal conductor and a surrounding tube therefor.

Figure 1:
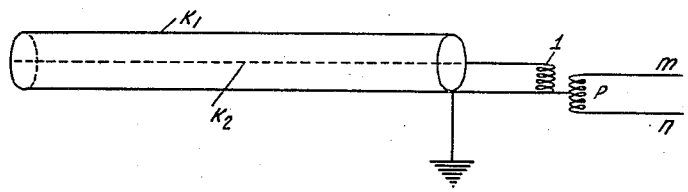
Figure 2:
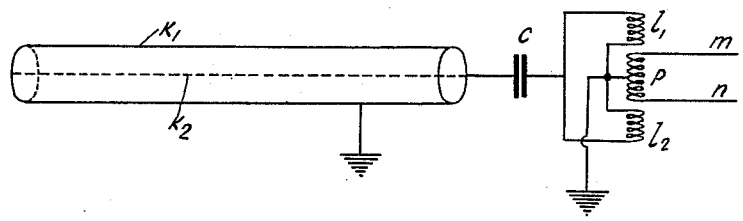

In the accompanying drawings, Fig. 1 shows a system heretofore used, and Fig. 2 shows applicant's improvement thereof.

According to former practice in order to couple such a double line with another one, a coupling coil was disposed between the inner and the outer conductor, for instance, in a way as shown in Fig. 1, where $k1$ is the outer conductor, $k2$ the inner one, and $mn$ a double line with which the former is to be associated or coupled. Coupling between the circuits was established by providing a coil $l$ between the inner and the outer conductor, said coil being in inductive coupling relationship with the coil $p$ of line $mn$. The outer conductor is usually grounded, and the middle point of the coil $p$ is likewise ordinarily earthed.

This scheme, which is inherently simple and suitable whenever long waves are worked with, involves the disadvantage, when operating on short waves or ultra-high frequencies, that disturbances are produced owing to dissymmetric additional capacitive or stray couplings.

Now according to this invention symmetric coupling of the circuits is insured by connecting, between the inner and the outer conductors, two coils in parallel instead of only one such coil, so that a symmetric condition is obtained.

An arrangement of this kind is shown in Fig. 2 where $k1$, $k2$ is the concentric double-conductor line, and $l_1$ and $l_2$ the two identical coils serving for coupling are connected between the inner and the outer conductor symmetrically and in parallel relationship. As shown in the drawing, both the outer conductor as well as point between the two coils $l_1$ and $l_2$ are grounded. Between these latter coils is arranged the coupling coil $p$ for the line $mn$. Also the middle point of the latter line $mn$ is grounded as shown. In order to compensate for the inductive load inherent in the coils $l_1$ and $l_2$ in the double line $k1$ and $k2$, a condenser $c$ is inserted in well-known manner. In this manner, antenna coupling, for example, may be made perfectly symmetrical and symmetry of the line $mn$ is insured both as regards inductance as well as capacity.

I claim:—

1. In a radio frequency transmission system an input circuit comprising a transmission line, an output circuit, a pair of paralleled primary transformer coils connected at their midpoint to ground and at their other common connection point to the input transmission line, and, a secondary coil connected to the output circuit and symmetrically coupled to said primary coils.

2. In combination, a high frequency input circuit, a high frequency output circuit, and coupling means for coupling the two circuits together, said coupling means comprising a transformer having a pair of primary coils connected in parallel fashion, one of the connection points of said primary coils being connected to ground, and the other connection of said paralleled coils being connected through a condenser to said input circuit, and a secondary transformer coil symmetrically coupled to said primary coils and grounded substantially at its electrical midpoint.

OMMO SCHMIDT.